March 26, 1929.  M. E. REAGAN  1,706,705
SYSTEM OF DISTRIBUTION
Filed Oct. 5, 1923

WITNESSES:
J. H. English.
J. E. Poster

INVENTOR
Maurice E. Reagan.
BY
Wesley G. Carr
ATTORNEY

Patented Mar. 26, 1929.

1,706,705

UNITED STATES PATENT OFFICE.

MAURICE E. REAGAN, OF PITTSBURGH, PENNSYLVANIA, ASSIGNOR TO WESTING-
HOUSE ELECTRIC & MANUFACTURING COMPANY, A CORPORATION OF PENNSYL-
VANIA.

SYSTEM OF DISTRIBUTION.

Application filed October 5, 1923. Serial No. 666,706.

My invention relates to systems of distribution and particularly to systems containing a main and an auxiliary bus, between which feeder circuits may be transferred in accordance with the condition of the circuits.

One object of my invention is to provide a system of control for transferring a feeder circuit from a main bus to an auxiliary bus, when the feeder circuit becomes short circuited, and for retransferring the feeder circuit to the main bus when the short-circuited conditions are cleared.

Another object of my invention is to provide a system of the above-indicated character that shall properly measure the resistance of the feeder circuit to determine whether a circuit shall be retransferred to the main bus, irrespective of the variations in the voltage of the auxiliary bus.

A further object of my invention is to provide connecting means between the main and the auxiliary bus that shall serve to disconnect the two buses when a sustained abnormal condition of the feeder circuit causes a transfer of excessive currents to the auxiliary bus from the main bus.

Another object of my invention is to provide a control system in a system of distribution whereby a feeder circuit, when grounded, may be transferred from a main bus from which it is normally energized, to an auxiliary bus from which sufficient energy will be supplied to the feeder circuit to clear the feeder circuit by burning out the faulty condition whereupon the faulty circuit shall be reconnected to the main bus.

In practicing my invention, I employ in addition to the main bus from which a feeder circuit is normally energized, an auxiliary bus to which the feeder circuit may be transferred, upon the occurrence of abnormal conditions therein.

Energy is then supplied to the feeder circuit to burn clear the faulty condition such as a short circuit caused by the grounding of the feeder circuit conductor.

In order to obtain sufficient energy for the purpose of burning clear the fault in the feeder circuit, energy may be supplied to the auxiliary bus from the main bus through a limiting resistor or from an incoming feeder circuit from an adjoining station, or from both the main bus and the incoming feeder circuit. When the faulty feeder circuit is transferred to the auxiliary bus, resistance-measuring means are rendered effective to measure the resistance of the feeder circuit conductor and the connected load and thereby to detect the clearance of the faulty condition. When the feeder circuit is cleared of the faulty condition, the resistance measuring means automatically effects the transfer of the feeder circuit to the main bus.

Since the auxiliary bus may be supplied with energy from the main bus or from an incoming feeder circuit or from both, it is obvious that the voltage of the auxiliary bus may vary considerably. Moreover, the transfer of an additional faulty feeder circuit to the auxiliary bus will tend still further to affect the voltage of the auxiliary bus.

Since the faulty feeder circuit is supplied with current from the auxiliary bus, the value of current that will traverse the feeder circuit depends upon the value of the voltage of the auxiliary bus. In measuring the resistance of the feeder circuit, it is therefore necessary to take into account the variation of the voltage of the main bus and to compensate for such variation. The voltage of the main bus, being substantially constant, cannot be utilized to energize the resistance-measuring device since there is no relation between the current in the feeder circuit and the voltage of the main bus.

In order to obtain the correct measure of the resistance of the feeder circuit and its connected load, I provide a relay device of a balance type embodying a balancing arm and two solenoids operating thereon, to control the opening of a switching device for an external circuit. One coil is energized in accordance with the current traversing the feeder circuit and the other coil is energized in accordance with the voltage of the auxiliary bus.

For any constant voltage on the auxiliary bus, the current traversing the current coil on the relay device will decrease in proportion as the resistance of the feeder circuit increases. When the current decreases to a predetermined value corresponding to the voltage of the auxiliary bus at that time, to indicate a predetermined value of resistance in the feeder circuit, the torque of the voltage coil will be sufficient to overcome that of the current coil and the relay device will operate to effect the retransfer of the feeder circuit from the auxiliary bus to the main bus.

For any constant value of resistance in the feeder circuit, an increase in the voltage of the auxiliary bus will effect a corresponding increase in the current traversing the feeder circuit. The increase in the ampere turns developed in the current coil of the balance relay will be balanced by a corresponding increase in the ampere turns developed in the voltage coil by reason of the increased voltage of the auxiliary bus.

Variations in the voltage of the auxiliary bus will, therefore, have no effect on the balance relay. A change in the resistance of the feeder circuit, however, will cause a variation in the value of current traversing the feeder circuit, irrespective of variations in the voltage of the auxiliary bus. A correct measure of the resistance of the feeder circuit may thus be obtained, irrespective of the voltage of the auxiliary bus.

If one or more faulty feeder circuits be transferred to the auxiliary bus and the current transferred to that bus from the main bus, through the resistor, exceeds the continuous current-carrying capacity of the resistor, a temperature-responsive device that is associated with, and influenced by, the resistor, will effect the opening of the resistor circuit, to preclude the further transfer of current therethrough while in this overheated condition.

Figure 1 of the accompanying drawing is a diagrammatic view of an electrical system embodying my invention.

Figure 1:
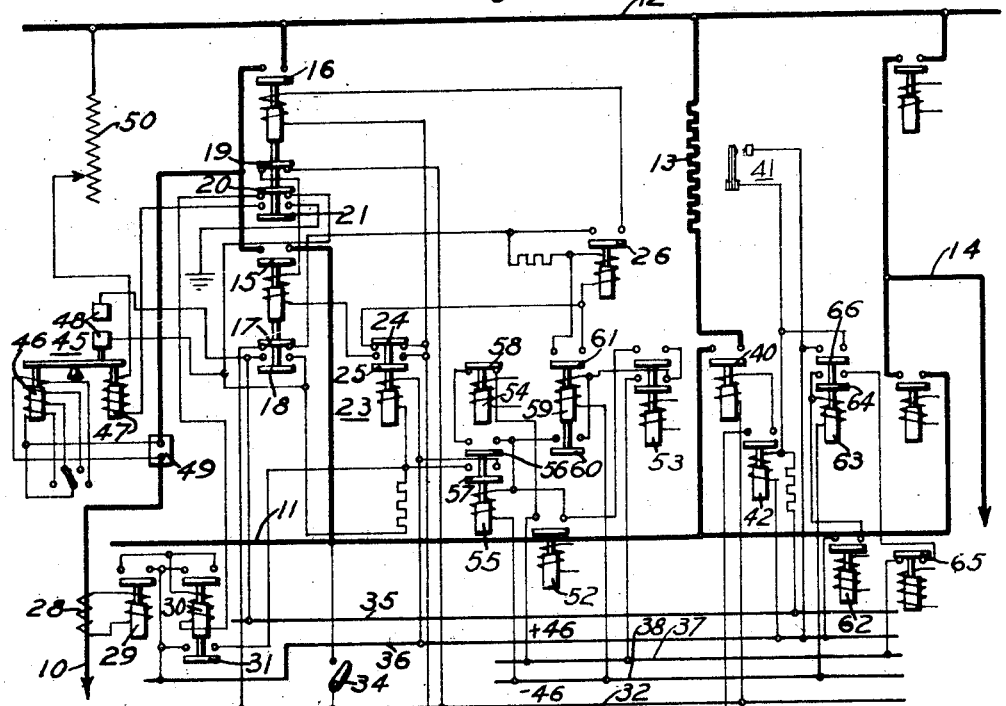

In Fig. 1, a feeder circuit 10 is supplied with energy from a main bus conductor 11 or from an auxiliary bus conductor 12 which may derive its energy from the main bus conductor 11 through a resistor 13, or from an incoming feeder circuit 14 from an adjacent station or substation.

The feeder circuit 10 may be connected to the main bus conductor 11 through the main contacts of a switching device 15, or it may be connected to the auxiliary bus conductor 12 through the main contacts of a switching device 16.

The switching device 15 is provided with two auxiliary interlock switches 17 and 18, the former of which is closed, and the latter of which is open, when the switching device is deenergized. The switching device 16 comprises, in addition to its main switch and its operating coil, two interlock switches 19 and 20 that are closed when the switching device is open, and an interlock switch 21 that is open when the switching device is open.

The operation of the switching device 15 is controlled by a control switch 23 comprising, in addition to its operating coil, a switch 24 that is closed when the operating coil is deenergized, and a switch 25 that is open when the operating coil is deenergized.

Similarly, a control switch 26 is provided to control the operation of the switching device 16, and is provided with but one set of contact members.

In order to detect an abnormal condition, such as a short-circuit condition, in the feeder circuit 10, I provide a current transformer 28, a solenoid relay 29 that is sensitive enough to respond quickly to the impulse delivered by the current transformer, and a holding relay 30 which serves to maintain the tripping circuit initially set up by the sensitive relay 29. The holding relay 30 is provided with a front interlock switch 31 that closes when the relay is energized.

In order to provide control energy for relay devices that are employed in a station containing the system described, three sets of bus conductors are provided. One set of conductors 32 and 33 have 600 volts impressed thereacross from the main bus 11 through a switch 34 which may be used to control the energy to the control conductors. A second set of control conductors 35 and 36 are employed having a potential difference of 240 volts and a third set of control conductors 37 and 38 are employed, having a potential difference of 92 volts.

During normal conditions on the feeder circuit 10, the switching device 15 is closed to connect the feeder circuit 10 to the main bus 11, as more fully set forth hereinafter. Upon the occurrence of abnormal conditions on the feeder circuit 10, the current transformer 28 delivers an impulse to the relay 29 which operates to complete a circuit from the conductor 36 through the operating coil of holding relay 30, the back interlock switch 20 of the switching device 16 and the interlock switch 18 of the switching device 15 to the control conductor 35. The holding relay 30 is thereupon energized to close its main switch and its auxiliary switch 31. The main switch 30 of the holding relay maintains the circuit that is broken by the relay 29 immediately after its operation, and the interlock switch 31, in closing, short circuits the operating coil of the control relay 23 by connecting both terminals of the coil to the bus conductor 36. The control relay 23 is thereupon deenergized to permit its interlock switch 24 to close, and its switch 25 to open.

The interlock switch 25 opens the circuit of the operating coil of the switching device 15, whereupon the latter opens to disconnect the feeder circuit 10 from the main bus conductor 11.

Simultaneously, the interlock switch 24, in closing, completes the circuit of the operating coil of control relay 26. That circuit may be traced from the control conductor 33 through the switch 24, the operating coil of the relay 26 and the back interlock switch 17 of the main switch 15 to the control conductor 32.

The control relay 26 is thereupon energized to close its switch, whereupon the circuit is completed to energize the operating coil of the switching device 16 to connect the feeder circuit 10 to the auxiliary bus 12. That circuit may be traced from the control conductor 32 through the back interlock switch 17 of the main switching device 15, the relay switch 26 and the operating coil of the switching device 16 to the control conductor 33. Switching device 16 thereupon closes to connect the feeder circuit 10 to the auxiliary bus 12.

Energy is now transmitted to the feeder circuit 10 from the main bus 11 through the auxiliary bus 12 and resistor 13, which is connected between both bus conductors 11 and 12 by a switch 40. If the conditions in the feeder circuit 10 are such that abnormal currents are drawn from the main bus 11 through the resistor 13, a thermostat 41 will operate to short circuit the operating coil of an auxiliary relay switch 42, which normally maintains the connecting switch 40 energized. When the operating coil of the switch 42 is short circuited by the overheated thermostat 41, the connecting switch 40 is opened, and the auxiliary bus 12 is disconnected from the main bus 11.

Simultaneously, with the closing of the switching device 16 to connect the feeder circuit to the auxiliary bus 12, a resistance-measuring device 45 is operatively connected between the feeder circuit 10 and the auxiliary bus 12.

The resistance-measuring device 45 comprises a balance arm, and two operating coils 46 and 47, which act upon the arm to control the opening or closing of a contactive device 48. The coil 46 is a current coil, and is energized from a shunt 49 in the feeder circuit 10 in accordance with the value of current traversing that circuit. The coil 47 is a potential coil and is connected between the auxiliary bus 12 and ground, through a variable resistor 50, and the front interlock switch 21 of the switching device 16. The resistance-measuring device may be calibrated by the resistor 50 or by other suitable means for varying the current in the current coil.

So long as the short-circuit conditions remain on the feeder circuit 10, current will traverse the circuit and the current coil 46 will be correspondingly energized.

Assuming the voltage of the auxiliary bus 12 to remain substantially constant, the current in the feeder circuit 10 and, consequently, in the current coil 46 will vary in inverse proportion to the resistance of the feeder circuit and the connected load. Thus, as the resistance increases, the current will decrease, until the torque developed thereby will be overbalanced by the torque of the potential coil, and the switching device 48 will be closed to effect the retransfer of the feeder circuit 10 from the auxiliary bus 12 to the main bus 11.

Since the current in the coil 46 and the voltage impressed upon the coil 47 have a ratio, according to Ohm's law, depending upon the value of the resistance of the feeder circuit 12, it is readily apparent that variations in the voltage of the auxiliary bus 12 will be compensated for by means of the arrangement which I here employ. Thus for any definite value of resistance, an increase in the voltage of the auxiliary bus will cause a corresponding increase in the current in the feeder circuit and, consequently, in the current coil 46. The relative conditions of the two operating coils and the torques developed thereby are therefore not changed by variations in the voltage of the auxiliary bus, but are affected only by variations in the resistance of the feeder circuit and the connecting load.

When the resistance of the feeder circuit and the connected load increases to a predetermined value at which the torque developed by the voltage coil 47 exceeds the torque developed by the current coil 46, the contactive device 48 is closed to connect the operating coil of the control switch 23 between the control conductors 35 and 36. The control switch 23 thereupon opens its switch 24 and closes its switch 25. The opening of the switch 24 interrupts the energizing circuit of the operating coil of the control switch 26, which, in turn, opens its switch to interrupt the energizing circuit of the operating coil of the switching device 16 to permit this device to disconnect the feeder circuit 10 from the auxiliary bus 12. When the switching device 16 is opened, its back interlock switch 19 is closed to complete the circuit of the operating coil of the switching device 15. This circuit extends from the control conductor 32 through the switch 19, the operating coil of the switching device 15, and the switch 25, which has been closed by the control switch 23, as just described, to the control conductor 33. The switching device 15 is thus closed to reconnect the feeder circuit 10 to the main bus 11.

In order to provide for remote control of the station by a system supervisor, three relay switches 52, 53 and 54 are provided. Relay 52 controls the transfer of the feeder circuit from the main bus to the auxiliary bus. Relay 53 controls the locking out of the feeder circuit to prevent its connection to either bus. Relay 55 controls the retransfer or reconnection of the feeder circuit to the main bus.

The relay switch 52, when energized, operates a relay switch 55 which is provided with two switches 56 and 57. The switch 57, when closed, short circuits the operating coil of the control relay 23, thereby deenergizing that relay to effect the opening of the main switch 15.

The switch 56, when closed, serves to maintain a holding circuit for the relay 55 which may be traced from the conductor 37 through an interlock switch 58 of the retransfer relay switch 54 and the switch 56, of the transfer relay 55, to the control conductor 38. The relay 55 will thereupon remain energized to maintain the operating coil of the controlling relay 23 short circuited until released by the system supervisor by energizing the retransfer relay 54.

Immediately after the opening of the main switch 15, the switch 16 is closed to connect the feeder circuit to the auxiliary bus conductor 12. When the main switch 15 and the control relay 23 are deenergized, the back interlock switch 17 of the main switch 15 and the back interlock switch 24 of the control relay 23 cooperate to connect the relay switch 26 between the control conductors 32 and 33. The switch 26 immediately closes to connect the operating coil of the switch device 16 between the control conductors 32 and 33, through the back interlock switch 17 of the main switch 15. The switch 16 thereupon closes to connect the feeder circuit 10 to the auxiliary bus.

If the system supervisor desires to lock out the feeder entirely by disconnecting it from the auxiliary bus 12 also, he will effect the energization of the lock-out relay 53 which, in turn, will energize a relay 59 between conductors 37 and 38. The relay 59, upon being energized, closes its switch 60 which then cooperates with switch 56 of relay 55 and switch 58 of retransfer relay 54, to maintain a holding circuit for the relay 59 by connecting the relay 59 between the control conductors 37 and 38. The relay 59 also closes its switch 61 which short circuits the operating coil of the control relay 26 that is associated with the switch device 16. Since the relay 59 holds itself in, the short circuit is maintained until the supervisor deenergizes the relay 59 by energizing the relay 54.

If the system supervisor desires to retransfer the feeder circuit from the auxiliary bus to the main bus, or to connect the feeder circuit to the main bus after it has been locked out, he may do so by energizing the retransfer relay 54, which will open its switch 58 to deenergize both relays 55 and 59, or the relay 55 alone, as the case may be.

Immediately after the deenergization of the relays 55 and 59, their respective switches 57 and 61 are opened to remove the short circuits across the operating coils of the control relays 23 and 26, respectively. The control relay 23 may now be energized, and since the current element of the resistance-measuring relay is not energized and the voltage element is energized, the switch 48 will be closed to connect the control relay 23 between the control conductors 35 and 36. Switch 25 of the control relay 23 thereupon cooperates with back interlock switch 19, of the switch 16, to reconnect the operating coil of the main switch 15 between the control conductors 32 and 33.

If the system supervisor should desire to disconnect the resistor that is normally connected between the main bus and the auxiliary bus, he will energize a relay 62 which connects a relay 63 between the control conductors 37 and 38. The relay 63 closes its switch 64 to maintain a holding circuit for itself through a relay switch 65 and closes another switch 66 to short circuit the operating coil of the relay 42 which thereupon opens to deenergize the switch 40. The switch 40, in opening, disconnects the resistor from the main bus 11 and opens the circuit therethrough.

The resistor may be reconnected by operating the relay 65 to open the circuit of the relay 63 which is then deenergized to remove the short circuit across the coil of relay 42. Relay 42 then operates to energize switch 40 to reconnect the resistor 13 between the main and the auxiliary buses.

The feeder circuit is thus normally connected to the main bus until abnormal conditions occur in the circuit. The circuit is then transferred to the auxiliary bus until the abnormal conditions are cleared and the connected load attains a value that will limit the load current to a safe value. When such conditions are attained, the feeder circuit is automatically transferred to the main bus.

If excessive heating should be developed in the resistor connected between both buses, the thermally-responsive element will disconnect the resistor to prevent an injury thereto.

The feeder circuits and the resistor may be correspondingly controlled by the system supervisor in the manner described.

Figure 2:
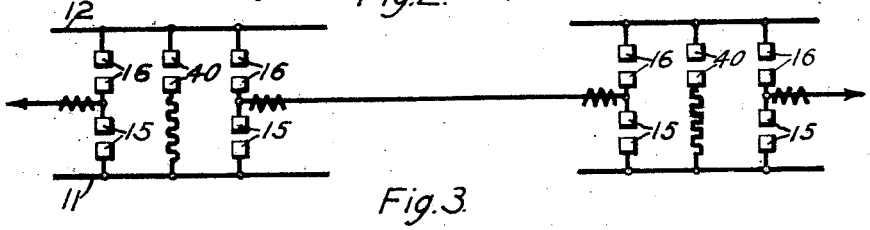
Fig. 2 is a schematic diagram illustrating the arrangement of a main switching device and two adjacent substations.

Fig. 2 illustrates the disposition of feeder circuits in a station and circuits connected between adjoining stations. Energy may thus be obtained from one or more adjoining stations to burn clear a faulty condition in a feeder circuit when the energy available in the station supplying the feeder circuit is insufficient.

Figure 3:
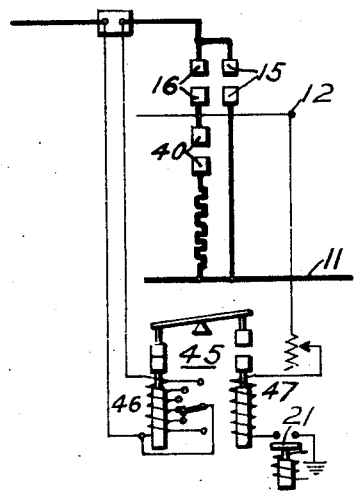
Fig. 3 is a simplified illustration of the disposition of a resistance-measuring relay that is employed in the system which is illustrated in Fig. 1.

Fig. 3 illustrates the disposition of the resistance-measuring relay 45 between the auxiliary bus and the faulty feeder circuit. By means of the current element 46, variations in the torque of the voltage element 47 are compensated for when such variations are caused by fluctuation of the voltage of the auxiliary bus.

My invention is not limited to the arrangment shown, since various changes may be made in the employment of different elements or in the arrangement thereof without departing from the spirit and scope of the invention, as set forth in the appended claims.

I claim as my invention:

1. In a system of distribution, the combination with a main supply bus, an auxiliary supply bus, means for connecting the auxiliary bus to the main bus comprising a load-limitng resitsor and a circuit interrupter connected in series therewith, a feeder circuit, and connecting means between the feeder circuit and each of the supply buses, of means for normally maintaining the connecting means between the feeder circuit and the main supply bus closed and the connecting means between the feeder circuit and the auxiliary supply bus open, means for normally maintaining the circuit between the main and auxiliary buses through the load-limiting resistor closed, means for opening the connecting means between the feeder circuit and the main supply bus and closing the connecting means between the feeder circuit and the auxiliary supply bus when a short-circuit occurs on the feeder circuit, whereby a reduced current is supplied to the feeder from the main bus through the resistor and the auxiliary bus, means for opening the connecting means between the feeder circuit and the auxiliary supply bus and for reclosing the connecting means between the feeder circuit and the main supply bus when the resistance of the feeder circuit and the load connected thereto attains a predetermined value, and means for opening the circuit interrupter in series with the load-limiting resistor between the main and auxiliary buses when a predetermined temperature condition exists in said resistor.

2. The combination in a distribution system with a feeder circuit and main and auxiliary supply buses, of means for transferring the feeder circuit from the main supply bus to the auxiliary supply bus on the occurrence of a short circuit on the feeder circuit, means for connecting the two buses whereby a reduced current is supplied to said feeder from the main bus, comprising a load-limiting device and a circuit interrupter, means for normally maintaining said circuit interrupter closed, and means for opening the interrupter when the temperature of said load-limiting device reaches a predetermined value.

3. The combination with a main supply bus, an auxiliary supply bus and a feeder circuit to be energized therefrom, of a resistor, means for connecting the resistor between both buses so that a limited current may flow from the main bus to the auxiliary bus, means energized from the feeder circuit upon the occurrence of abnormal conditions therein to transfer the feeder circuit from the main to the auxiliary bus, and means for opening the resistor-connecting means depending upon the temperature developed in the resistor by the currents supplied therethrough to the feeder circuit from the main bus.

4. The combination with a feeder circuit and main and auxiliary supply buses, of means for transferring the feeder circuit from the main supply bus to the auxiliary supply bus when a short-circuit occurs on the feeder circuit, means for retransferring the feeder circuit to the first supply bus when the resistance of the feeder circuit and the load connected thereto attains a predetermined value, means for connecting the two buses so that the main bus may supply a reduced current to the feeder, comprising a load-limiting device and a circuit interrupter, and means for normally maintaining said circuit interrupter closed, and means for opening the interrupter in accordance with the temperature of said load-limiting device.

5. The combination with a feeder circuit and main auxiliary supply buses, of means for transferring the feeder circuit from the main supply bus to the auxiliary supply bus on the occurrence of an overload on the feeder circuit, means for connecting the two buses so that the main bus may supply a limited current to the auxiliary bus comprising a load-limiting device and a circuit interrupter, and means for opening said circuit interrupter when said load-limiting device attains a predetermined temperature and for reclosing said circuit interrupter when the temperature of said load-limiting device falls below a predetermined value.

6. The combination with a feeder circuit and main and auxiliary supply buses, of means for transferring the feeder circuit from the main supply bus to the auxiliary supply bus when a short-circuit occurs on the feeder circuit, means for retransferring the feeder circuit to the first supply bus when the resistance of the feeder circuit and the load connected thereto attains a predetermined value, means for connecting the two buses comprising a load-limiting device and a circuit interrupter, whereby a reduced current flows from the main bus to the auxiliary bus, and means for opening said circuit interrupter when said load-limiting device attains a predetermined temperature and for reclosing said circuit interrupter when the temperature of said load-limiting device falls below a predetermined value.

7. In a system of distribution, the combination with a main bus, an auxiliary bus and a plurality of feeder circuits to be energized therefrom, of resistance means connected between both buses to conduct a limited current to the auxiliary bus, means for transferring a feeder circuit from the main to the auxiliary bus upon the occurrence of abnormal conditions in the feeder circuit and means responsive to the temperature of the resistance means after such transfer for controlling its connection between the buses.

In testimony whereof, I have hereunto subscribed my name this 28th day of September, 1923.

MAURICE E. REAGAN.